3,025,137
PRODUCTION OF SINTERED COMPACTS
OF BERYLLIA
Peter Murray, Abingdon, and David Thomas Livey, Pickler's Hill, Abingdon, England, assignors to United Kingdom Atomic Energy Authority, London, England
No Drawing. Filed May 27, 1959, Ser. No. 816,052
Claims priority, application Great Britain June 2, 1958
2 Claims. (Cl. 23—183)

This invention relates to processes for producing sintered compacts of beryllia, and is particulary concerned with producing high density compacts from pure calcined beryllia powder.

It has previously been found that when beryllia powder of very high purity, such as may be required for use as a neutron moderator in a nuclear reactor, is subjected to the normal process of cold-compacting and then sintering by heating rapidly to a temperature in the region of 1600° C., sintered compacts of rather low density (e.g. 2.2 gm./cc.) and of high porosity are obtained. The theoretical density of beryllia is 3.03 gm./cc. and it is desirable to attain densities approaching this value in compacts of beryllia for use in nuclear reactors.

According to the present invention, a process for producing a sintered compact of pure beryllia comprises cold-compacting a pure calcined beryllia powder, heating the cold-compacted powder for a prolonged period at a temperature below about 1400° C., and then heating to a sintering temperature of at least 1500° C.

Preferably the step of heating at a temperature below about 1400° C., is carried out at a temperature in the region of but not less than the temperature at which the beryllia powder was originally produced by calcining.

Preferably also, the beryllia powder is a powder which has been produced by calcining pure beryllium hydroxide at about 1250° C., and the cold-compacted powder is heated for a prolonged period at temperatures between 1250° C. and 1400° C.

The length of the period of heating necessary at a temperature below 1400° C., depends on the temperature used, but is such as will cause substantially all the particles of the powder to be welded together. Such a condition can be readily ascertained by microscopic examination of a test compact, and by the fact that heating the compact to a sintering temperature of at least 1500° C., results in a high density compared with that of a compact which has not been heated for any substantial period below 1400° C. We have found that a period of 40–60 hours at temperatures between 1100° C., and 1400° C., is more than sufficient, and that a period of 12 hours at a temperature between 1250° C., and 1400° C., is probably sufficient for most starting materials.

After heating for a prolonged period at a temperature below 1400° C., the compact is preferably heated gradually, or in stages, to the maximum sintering temperature of at least 1500° C.

Calcined beryllia is beryllia which has been produced by the decomposition by heat of a compound of beryllium, such compounds including beryllium hydroxide, carbonate and oxalate. The calcining temperature, that is the temperature at which the beryllia is produced by decomposition, may vary between 500° C., and 1400° C., the beryllia produced at the lowest temperatures having the smallest crystallite size and therefore the highest surface area.

Pure calcined beryllia obtained by heating pure beryllium hydroxide has an impurity content of less than about 0.5% by weight, a typical analysis being given in the following table:

TABLE I

| Impurity: | Parts per million |
|---|---|
| Sodium | 3,500 |
| Lithium | 350 |
| Magnesium | 250 |
| Calcium | 300 |
| Silicon | 135 |
| Aluminium | 100 |
| Iron | 55 |
| All others | 210 |
| Total | 4,900 | i.e. 0.49%

The sintering behaviour of pure calcined beryllia depends on the calcining temperature. The following table shows the density attained by cold-pressing pure beryllia powder produced at various calcining temperatures and then sintering by heating rapidly (i.e. in 6 hours) to 1600° C., and holding at this temperature for ½ hour.

TABLE II

| Calcining temperature, ° C.: | Sintered density, gm./cc. |
|---|---|
| 500 | 1.80 |
| 700 | 1.82 |
| 900 | 2.01 |
| 1100 | 2.03 |
| 1250 | 2.19 |
| 1400 | 2.01 |

This table shows that the maximum density is attained with beryllia calcined at 1250° C., but that this density is still only 72% of the theoretical density of beryllia.

We have now discovered that if a cold-pressed compact of pure calcined beryllia is heated for a prolonged period at a temperature in the region of that at which it was originally calcined or at temperatures between that at which it was originally calcined and about 1400° C., and is then heated gradually to a maximum temperature of at least 1500° C., then a beryllia compact of much higher density is produced.

We believe that heating at the calcining temperature, or at temperatures between the calcining temperatures and about 1400° C., causes interparticulate welding to occur, without any shrinkage or densification of the compact. Then, when the temperature is raised, the fine pore structure of the compact is retained during the shrinkage and densification caused by sintering. By carrying out the sintering step gradually or in stages rupture of the welds between the particles is avoided. In the absence of a period of heating below 1400° C., shrinkage during sintering causes separation of some particles when others are drawn together by the sintering process, thus leading to the formation of large pores and fissures.

The nature of the invention and the manner in which it is to be performed will be made more apparent by the following examples:

*Example I*

Beryllium oxide powder produced by calcining pure beryllium hydroxide at 900° C., and having a surface area of 20 sq. metres/gm., was cold-compacted at 10 tons/sq. in. (1580 kg./sq. cm.) and then heated rapidly to 1000° C. After 1 hour at this temperature it was heated at 1100° C., for 7 hours, at 1200° C., for 15 hours, at 1300° C., for 11 hours, at 1350° C., for 7 hours, at 1400° C., for 7 hours, at 1450° C., for 8 hours, and finally at 1500° C., for 7 hours. The density of the sintered compact was then found to be 2.68 gm./cc. (88.5% of theoretical) compared with the value of 2.01 gm./cc. given in Table II where heating to 1600 C., took place over a period of only 6 hours.

Example II

Beryllium oxide powder produced by calcining beryllium hydroxide at a temperature of 1250° C., and having a surface area of 10 sq. metres/gm., was cold-compacted at 5 tons/sq. in. (790 kg./sq. cm.) and then heated rapidly to 1300° C., which temperature was held for 29½ hours. The temperature was then raised to 1350° C., and this temperature maintained for 33 hours when it was again raised to 1450° C., and held for 40 hours. At the end of the 40 hours the temperature was increased to 1550° C., which was held for 8 hours until finally raising the temperature to 1600° C., for a further 8 hours.

The density of the sintered compact was then found to be 2.75 grams./cc. (91% of theoretical), compared with the value of 2.19 gms./cc. given in Table II.

We claim:

1. A process of producing a sintered compact of pure beryllia which comprises cold-compacting a substantially pure beryllia powder produced by calcining pure beryllium hydroxide at 900° C., heating the cold compacted powder for at least 40 hours at temperatures between 1100° C., and 1400° C., and then heating to a sintering temperature of at least 1500° C.

2. A process of producing a sintered compact of pure beryllia which comprises cold-compacting a beryllia powder produced by calcining pure beryllium hydroxide at 1250° C., heating the cold compacted powder for at least 12 hours at temperatures between 1250° C., and 1400° C., and then heating to a sintering temperature of at least 1500° C.

References Cited in the file of this patent

UNITED STATES PATENTS 2,818,605    Miller _____ Jan. 7, 1958